United States Patent [19]

Ishida

[11] Patent Number: 4,852,525
[45] Date of Patent: * Aug. 1, 1989

[54] COMBUSTION CHAMBER IN INTERNAL COMBUSTION ENGINE

[75] Inventor: Shiro Ishida, Fujisawa, Japan

[73] Assignee: Isuzu Motors Limited, Tokyo, Japan

[ * ] Notice: The portion of the term of this patent subsequent to Dec. 1, 2004 has been disclaimed.

[21] Appl. No.: 932,804

[22] Filed: Nov. 19, 1986

[30] Foreign Application Priority Data

Nov. 21, 1985 [JP] Japan .................................. 60-259750

[51] Int. Cl.$^4$ ............................................. F02B 23/08
[52] U.S. Cl. .................................... 123/256; 123/260; 123/276
[58] Field of Search ................ 123/276, 279, 256, 260, 123/261

[56] References Cited

U.S. PATENT DOCUMENTS

| 2,881,743 | 4/1959 | Holt | 123/263 |
| 3,125,079 | 3/1964 | Hoffmann | 123/279 |
| 3,144,008 | 8/1964 | List | 123/276 |
| 3,504,681 | 4/1970 | Winkler | 123/276 |
| 4,709,672 | 12/1987 | Ishida | 123/276 |

FOREIGN PATENT DOCUMENTS

| 57-41417 | 3/1982 | Japan | 123/276 |
| 58-48710 | 3/1983 | Japan | 123/276 |
| 59-221419 | 12/1984 | Japan | 123/261 |

Primary Examiner—Andrew M. Dolinar
Attorney, Agent, or Firm—Cullen, Sloman, Cantor, Grauer, Scott & Rutherford

[57] ABSTRACT

According to the present invention, main and subcombustion chambers into which fuel is fed directly in an atomized state and in each of which a swirl is formed, are formed in communication with each other in a top portion of a piston, in order to use not only gas oil but also other volatile fuels of low cetane number such as gasoline and alcohol. Further, in order to improve the combustion performance, fuel is supplied into the subcombustion chamber in a finely pulverized state for easier evaporation, and fuel is adhered as liquid films to the main and subcombustion chambers. By so doing, ignition is ensured in all load conditions and it becomes possible to effect evaporation and combustion on the wall surface of each combustion chamber. Consequently, it is possible to obtain a combustion performance which is low in combustion noise and vibration and also low in the formation of unburnt matter.

13 Claims, 3 Drawing Sheets

COMBUSTION CHAMBER IN INTERNAL COMBUSTION ENGINE

BACKGROUND OF THE INVENTION

1. Field of Invention

The present invention relates to a combustion chamber in an internal combustion engine which permits the use of not only gas oil but also volatile fuel oils and low cetane number fuel oils. More particularly, it is concerned with a combustion chamber in an internal combustion engine in which engine starting performance and low load driving performance are improved.

2. Description of the Prior Art

A combustion chamber for the combustion of fuel oils, e.g. gas oil, is shown in a Diesel engine described in Japanese Utility Model Laid Open No. 150702/79. In this conventional combustion chamber structure, which is shown in FIG. 5 of the accompanying drawing, a main combustion chamber (c) in which there is inserted a fuel injection nozzle (b), and a subcombustion chamber (e) in which there is inserted an auxiliary firing device (d), communicate with each other and are formed in a piston (a), and a protuberant portion (f) is formed at the portion of communication between both combustion chambers (c) and (e).

In the above construction, the main and the subcombustion chamber communicate with each other in spite of the difficulty of disposing both the fuel injection nozzle and the auxiliary firing device in such a manner as to face the interior of a single combustion chamber. According to such a construction, there are attained freedom of layout and protection of the auxiliary firing device from heat load.

However, the above conventional construction involves the following drawbacks from the standpoint of combustibility.

The fuel injection nozzle used therein injects fuel into the main and subcombustion chambers independently of load and the number of revolutions, and it has a plurality of nozzle holes as shown in FIG. 5. Therefore, under the condition of low revolution and low load, including idling of the engine, the air-fuel mixture in the subcombustion chamber, which mainly functions to effect fire nucleation, becomes lean. As a result, the mixture is difficult to fire even when ignition is made by the auxiliary firing device. Further, there is a risk of misfire because of poor fire propagation.

The above problems result when gas oil is used as the fuel. In the case of the use of fuels of a low cetane number, namely, volatile fuel oils such as gasoline and alcohol, fuel oil injected into the subcombustion chamber is diffused into the main combustion chamber because of its thinness, resulting in the mixture in the subcombustion chamber becoming still leaner. One means for solving this problem may be throttling of intake air, but the resulting increase in pumping of the engine leads to the loss of output performance and deterioration of the fuel economy. Thus, this approach is not considered to be a good solution where it is desirable to develop a combustion chamber superior having combustion characteristics.

SUMMARY OF THE INVENTION

It is the object of the present invention to provide a combustion chamber in an internal combustion engine capable of satisfying the following requirements:

(1) Not only gas oil but also volatile fuels of low cetane number such as gasoline and alcohol should be employable in all load conditions including an engine standing load.
(2) During combustion, it should be possible to suppress the formation of unburned matter and suppress the increase of noises and vibrations.
(3) It should be possible to obtain combustibility equal or superior to that in gasoline engines in both output performance and fuel economy.

The above objects are attained by the following construction.

In the top of a piston there is formed a main combustion chamber which is recessed in an axial direction with respect to the top surface of the piston. In the top portion of the piston, moreover, the peripheral sidewall which forms the main combustion chamber is partially recessed radially outwardly on an upper side edge thereof to form a subcombustion chamber contiguous to the main combustion chamber.

A fuel-injecting nozzle means having subnozzle holes for supplying fuel in an atomized state into the subcombustion chamber and a main nozzle hole for atomizing fuel into the main combustion chamber are disposed in facing relation to those combustion chambers.

In the subcombustion chamber there is disposed an ignition means for accelerating the ignition of the air-fuel mixture in the subcombustion chamber.

The operation in the above construction will now be described. Under light load conditions, fuel of a low cetane number is supplied in atomized state into the subcombustion chamber from the subnozzle holes. Since the subcombustion chamber is smaller in capacity than the main combustion chamber, the mixture therein becomes richer and a rapid combustion is effected even at this stage. In medium and high load conditions, fuel larger in particle diameter than that atomized from the subnozzle holes is injected into the main nozzle hole. The fuel mist thus injected is evaporated by a high temperature heat of the wall surface and that of compressed air. The thus-evaporated fuel mixes with air and the mixture is burnt under flame propagation by heat energy and flame formed in the subcombustion performance in which the delay of firing and the formation of bluish white smoke and noises are greatly reduced.

DESCRIPTION OF A PREFERRED EMBODIMENT

A preferred embodiment of the combustion chamber in an internal combustion engine of the present invention will be described hereinunder with reference to the accompanying drawings.

Figure 1:
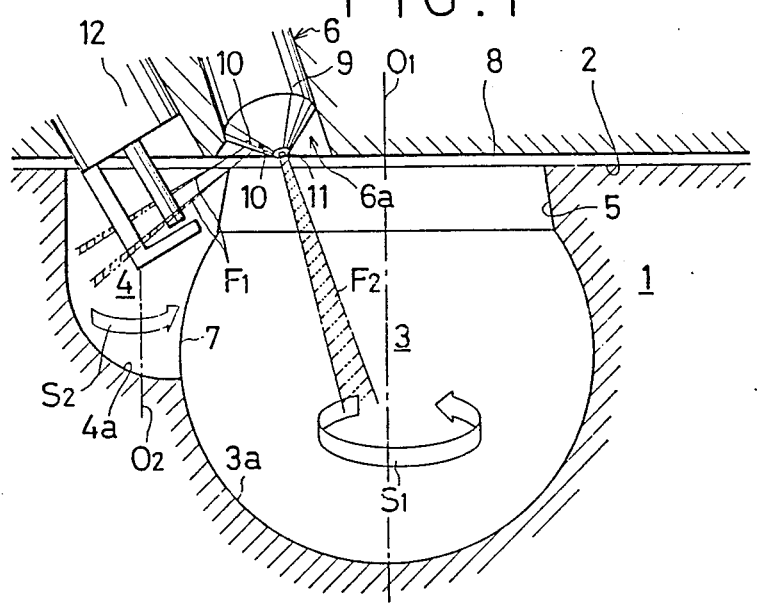
FIG. 1 is a schematic longitudinal sectional view of a combustion chamber in an internal combustion engine according to a preferred embodiment of the present invention.
Figure 2:
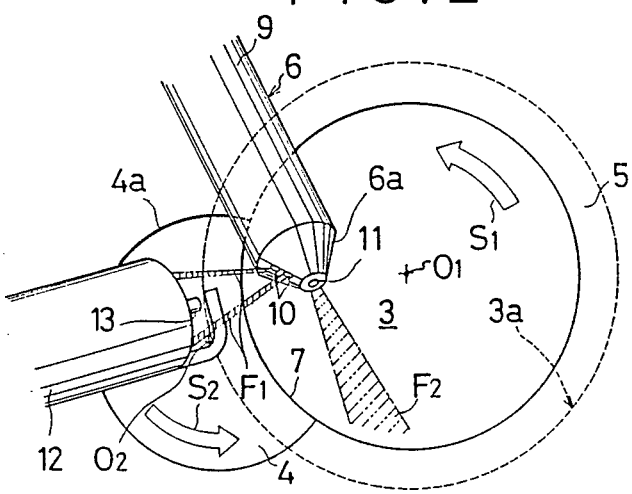
FIG. 2 is a plan view thereof.
Figure 3:
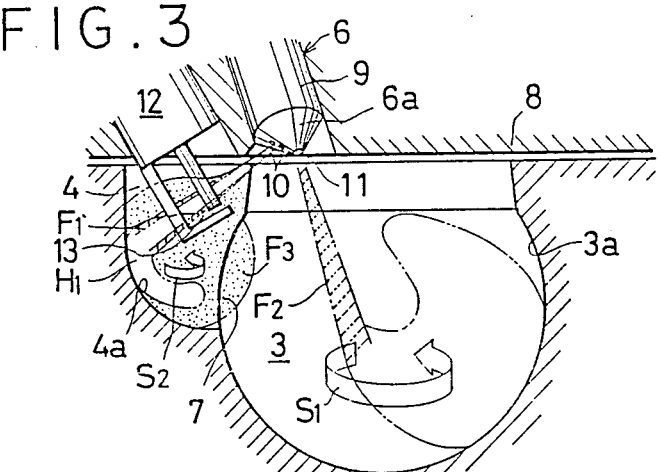
FIGS. 3 and 4 are schematic sectional views and plan views, respectively, showing fuel sprays and fuel vapor layers.
Figure 4:
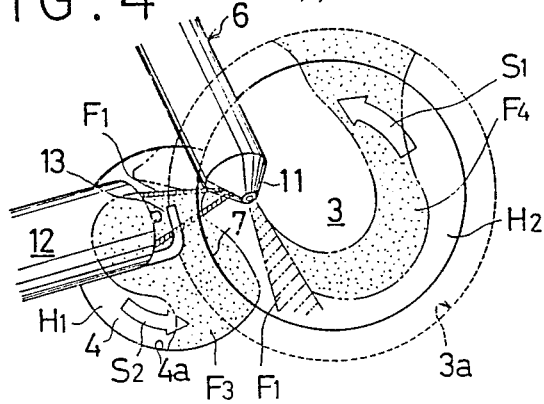
Figure 5:
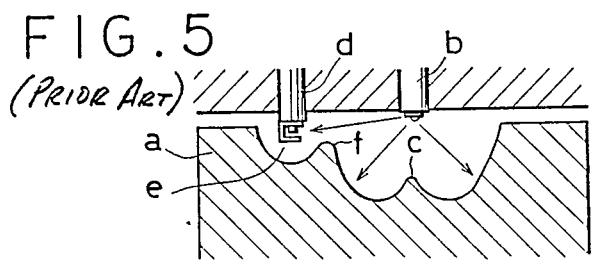
FIG. 5 is a schematic longitudinal sectional view showing a conventional combustion chamber structure in Diesel engine; and, FIG. 6 is a schematic sectional view of the fuel injecting nozzle means.
Figure 6:
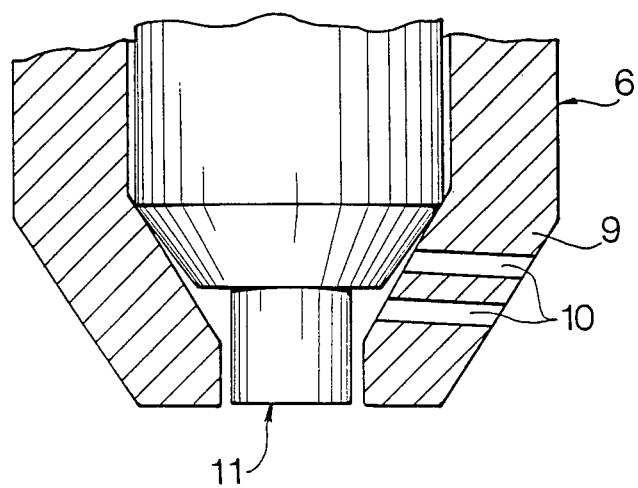

In FIGS. 1 and 2, the reference numeral 1 denotes a piston disposed reciprocably in and along a cylinder (not shown) of an internal combustion engine; the numeral 2 denotes a piston top which forms a top surface of the piston 1; and numerals 3 and 4 denote a main combustion chamber and a subcombustion chamber, respectively.

As shown in FIGS. 1 and 2, the main combustion chamber 3 is recessed in the piston top 2 in the axial direction of the piston 1. Further recessed in the piston top 2 is the subcombustion chamber 4 in a radially outward position with respect to the main combustion chamber 3. In this embodiment, a vertical section of the main combustion chamber 3 passing through an axis $O_1$ of the piston 1 is in the form of a truncated circle. Transverse sections of the main combustion chamber 3 and subcombustion chamber 4 perpendicular to the axial direction of the piston 1 are both circular.

The subcombustion chamber 4 is shallower than the main combustion chamber 3, and the subcombustion chamber 4 is smaller in capacity than the main combustion chamber 3.

An inner peripheral wall 3a of the main combustion chamber 3 and an inner peripheral wall 4a of the subcombustion chamber 4 are radially open at the respective portions positioned between both combustion chambers. This opening serves as a communication port 7 for contiguous connection of both combustion chambers. The communication port 7 is formed by drawing an axis $O_2$ of the subcombustion chamber 4 close to the axis $O_1$ of the main combustion chamber 3. The degree of overlap of the subcombustion chamber 4 with respect to the main combustion chamber 3 increases with increase of the approach, and the opening area of the communication port 7 is determined according to the degree of overlap.

Thus, the subcombustion chamber 4 is formed contiguously on an upper side of the main combustion 3, and rotating currents of air for combustion are supplied into the combustion chambers 3 and 4 to form independent swirls $S_1$ and $S_2$ in the chambers 3 and 4, respectively.

The upper portion of the main combustion chamber 3 extending in the circumferential direction projects radially inwards to an appropriate extent to throttle the upper opening of the main combustion chamber 3 and this throttled portion indicated by the numeral 5 creates a squish current which is forced into the main combustion chamber 3.

In the vicinity of the communication port 7 between the main combustion chamber 3 and the subcombustion chamber 4 there is provided a fuel-injecting nozzle means 6 facing the port 7. The fuel-injecting nozzle means 6 is enclosed in a cylinder head 8 so that a nozzle hole side 6a thereof faces the combustion chamber side. The nozzle means 6 is composed principally of a nozzle body 9 enclosed in the cylinder head 8, a needle valve (not shown) which is vertically movable with respect to a valve seat (not shown) provided in the nozzle body 9, a plurality of subnozzle holes 10 formed through the valve seat, and a main nozzle hole 11 which is opened and closed by a throttle portion of the needle valve. The needle valve is lifted by a hydraulic fuel pressure provided from an injection pump (not shown). More specifically, when the lift value of the needle valve is below a predetermined lift value, the subnozzle holes 10 are opened, while when the lift value is above the predetermined lift value, the main nozzle hole 11 is opened, and thus the fuel-injecting nozzle means 6 is a so-called pintaux-type nozzle means.

The subnozzle holes 10 are each formed extremely small in diameter as compared with the main nozzle hole 11 so that upon opening thereof there is injected a fuel mist $F_1$ having a good ignitability in an atomized state into fine particles. On the other hand, a fuel mist $F_2$ having a larger particle diameter than the fuel mist $F_1$ and superior in penetrability and diffusibility is injected from the main nozzle hole 1.

In this embodiment, moreover, an ignition means 12 comprising a spark plug or the like is provided within the subcombustion chamber 4 so that an ignition part 13 thereof faces the interior of the subcombustion chamber 4. The subnozzle holes 10 are formed so as to face both upstream and downstream sides of the swirl $S_2$ with the ignition part 13 disposed therebetween. Thus, the subnozzle holes 13 are arranged so that they face the vicinity of the ignition part 13 and are directed to the inner wall 4a of the subignition chamber 4. On the other hand, the main nozzle hole 11 is directed to the inner wall 3a of the main combustion chamber 3 and directed to a downstream side of the swirl $S_1$ which is formed within the main combustion chamber 3.

The operation of the present invention will be explained below with reference to the accompanying drawings.

As shown in FIGS. 1 to 4, the swirls $S_1$ and $S_2$ supplied and formed from swirl ports (not shown) circle independently in the main and subcombustion chambers 3 and 4, respectively, by virtue of fluid inertia while being compressed.

At the time of the start-up of the engine or in a low load condition of the engine, the atomized fuel mist $F_1$ of a low cetane number is injected into the subcombustion chamber 4 from the subnozzle holes 10 of the fuel-injecting nozzle means 6. A portion of the thusinjected fuel mist $F_1$ is brought into impingement with the inner wall 4a of the subcombustion chamber 4, while the remaining portion thereof forms a fuel film $H_1$ which is allowed to flow along the inner wall 4a.

A portion of the injected fuel of low cetane number is evaporated in an instant by a high temperature heat of compressed air because of its small particle size and mixes with air to form a fuel vapor layer $F_3$ which is easy to fire and burn in the subcombustion chamber 4. The fuel film $H_1$ is evaporated by the heat of compressed air and the wall heat.

Therefore, upon ignition by the ignition means 12, the fuel vapor layer $F_3$ ignites and is burnt quickly. The resulting flame is propagated to the fuel film $H_1$ of the portion flowing and evaporated along the inner wall 4a of the subcombustion chamber 4, so that the fuel film $H_1$ is burnt. At the time of start-up of the engine at a low temperature, the ignitability of fuel for the operation of the ignition means 12 can be controlled by adjusting the air-fuel ratio.

Thus, since the finely pulverized fule mist $F_1$ supplied from the subnozzle holes 10 is directed to the inner wall 4a of the subcombustion chamber 4, a substantial amount of fuel is distributed along the inner wall 4a. Further, the fuel portion distributed on the wall surface by the fired heat energy is gradually evaporated and burnt. The greater part of the combustion gas in the subcombustion chamber 4 is confined therein by the swirl $S_2$, so when the engine load is low, combustion is performed in the subcombustion chamber 4. Consequently, the combustion temperature in the chamber 4 rises and it becomes possible to suppress the formation of bluish white smoke and unburnt matter (HC). Thus, in a low load condition, an average combustion temperature in the subcombustion chamber 4 rises so the formation of bluish white smoke and unburnt matter (HC) can be prevented.

When the engine load is high, atomized fuel or the fuel mist $F_2$ is also injected from the main nozzle hole 10 toward the inner wall 3a of the main combustion chamber 3 and toward the downstream side of the swirl $S_1$. As a result, a fuel film $H_2$ and a fuel vapor layer $F_4$ are formed in the main combustion chamber 3 in the same state as in the subcombustion chamber 4. At this time, a portion of the combustion gas in the subcombustion chamber 4 flows into the main combustion chamber 3, resulting in a flame that is propagated to the fuel vapor layer $F_4$ in the main combustion chamber 3, whereby the fuel film $H_2$ in the chamber 3 is ignited and burnt. In this connection, because the fuel portion injected and atomized from the main nozzle hole 11 is larger in particle diameter than the fuel portion injected in atomized condition form the subnozzle holes 10 and has a large penetrability, and also because the volume of the fuel vapor layer $F_4$ formed by mixing of the fuel portion evaporated on stirring of the swirl $S_1$ with air is not excessive, a slow combustion occurs in the main combustion chamber 3. In other words, the heat generated upon firing of the fuel vapor layer $F_4$ causes the remaining fuel film $H_2$ to evaporate quickly and the resulting vapor burns slowly. A slow combustion is thus effected. In this way, a rapid combustion in the main combustion chamber 3 is prevented, so that the increase of pressure in the main combustion chamber 3 is suppressed, and consequently noiss can be further diminished. Additionally, the fuel-injecting nozzle means 6 is constructed so that the higher the load, the larger the amount of fuel injected from the main nozzle hole 11, more particularly, a maximum of 90% or more is injected in a high load condition of the engine. Consequently, the above action is reliably attained and the fuel vapor layer $F_4$ and fuel film $H_2$ formed by the fuel mist $F_2$ are fired reliably by the flame flowing into the main combustion chamber from the subcombustion chamber 4.

Although a low cetane number fuel has been used above as an example of fuel injected from the fuel-injecting nozzle means 6, fuels of a high cetane number, e.g. gas oil, can also be burnt well according to the present invention.

What is claimed is:

1. A combustion chamber for an internal combustion engine, of the type using a fuel of low ignitability such as alcohol, gasoline, or methanol, comprising:
   a main combustion chamber recessed axially in a first top portion of a piston;
   a subcombustion chamber recessed radially outward in a second top portion of said piston and on an upper side of said main combustion chamber, said subcombustion chamber being contiguous to said main combustion chamber with the depth of said subcombustion chamber being less than that of said main combustion chamber, said main and subcombustion chamber being arranged so that combustion gas burned in said subcombustion chamber will be carried into said main combustion chamber;
   an ignition means provided within said subcombustion chamber in order to assist ignition; and
   fuel injecting nozzle means for spouting fuel sprays, said nozzle means having subnozzle means for injecting fuel into said subcombustion chamber during all running conditions of the engine, and having a main nozzle hole for injecting fuel into said main combustion chamber only when the engine is operating under running conditions heavier than a light load condition.

2. A combustion chamber for an internal combustion engine, as recited in claim 1, wherein said main combustion chamber and subcombustion chamber are formed in a manner such that swirls are generated in said combustion chambers and the swirl of said subcombustion chamber leaves the subcombustion chamber in a direction which is different with regard to the direction the swirl within said main combustion chamber.

3. A combustion chamber for an internal combustion engine as recited in claim 1, wherein said main combustion chamber and said subcombustion chamber are each hemispherical in shape, the depth and volume of said subcombustion chamber being less than the depth and volume of said main combustion chamber.

4. A combustion chamber for an internal combustion engine as recited in claim 3, wherein each of said main and subcombustion chambers is an open chamber having a brim and a lip portion extending radially inward from said brim.

5. A combustion chamber for an internal combustion engine as recited in claim 1, wherein said fuel injection nozzle means includes a slidable needle valve fitted in a nozzle body so as to open said subnozzle means when the lift thereof is below a predetermined lift and to open said main nozzle hole when the lift thereof is above said predetermined lift.

6. A combustion chamber for an internal combustion engine as recited in claim 5, wherein said subnozzle means includes a plurality of subnozzle holes each for injecting fuel.

7. A combustion chamber for an internal combustion engine as recited in claim 1, wherein said main nozzle hole and said subnozzle means of said fuel injection nozzle means are directed so as to spout fuel toward the inner surfaces of said main combustion chamber and said subcombustion chamber respectively, and in the directions in which the swirls of the main combustion chamber and of the subcombustion chamber flow respectively.

8. A combustion chamber for an internal combustion engine as recited in claim 7, wherein said subnozzle means includes a plurality of subnozzle holes each for injecting fuel.

9. A combustion chamber for an internal combustion engine as recited in claim 1, wherein said subnozzle means includes a subnozzle hole and the diameter of the subnozzle hole of said fuel injection nozzle means is very small compared with the diameter of the main nozzle hole of said fuel injection nozzle means.

10. A combustion chamber for an internal combustion engine as recited in claim 9, wherein said subnozzle means includes a plurality of subnozzle holes each for injecting fuel.

11. A combustion chamber for an internal combustion engine as recited in claim 1, wherein said ignition assisting means includes a spark plug.

12. A combustion chamber for an internal combustion engine as recited in claim 1, wherein said subnozzle means includes a plurality of subnozzle holes each for injecting fuel.

13. A combustion chamber for an internal-combustion engine, of the type using fuel of low ignitability such as alcohol, gasoline, or methanol, comprising:
- a main combustion chamber recessed axially in a first top portion of a piston;
- a subcombustion chamber recessed radially outward in a second top portion of said piston and on an upper side of said main combustion chamber, said subcombustion chamber being contiguous to said main combustion chamber, with the volume of said subcombustion chamber being smaller than that of said main combustion chamber;
- an ignition means provided within said subcombustion chamber in order to assist ignition; and
- fuel injection nozzle means for spouting fuel sprays, said nozzle means having subnozzle holes for injecting fuel in two directions respectively toward the upstream side and downstream side of the swirl with respect to the ignition means in a manner such that the sprays from the subnozzle holes pass by said ignition means during all running conditions of the engine, and a main nozzle hole for injecting fuel into said main combustion chamber only when the engine is operating under a running condition heavier than a light load condition.

* * * * *